UNITED STATES PATENT OFFICE.

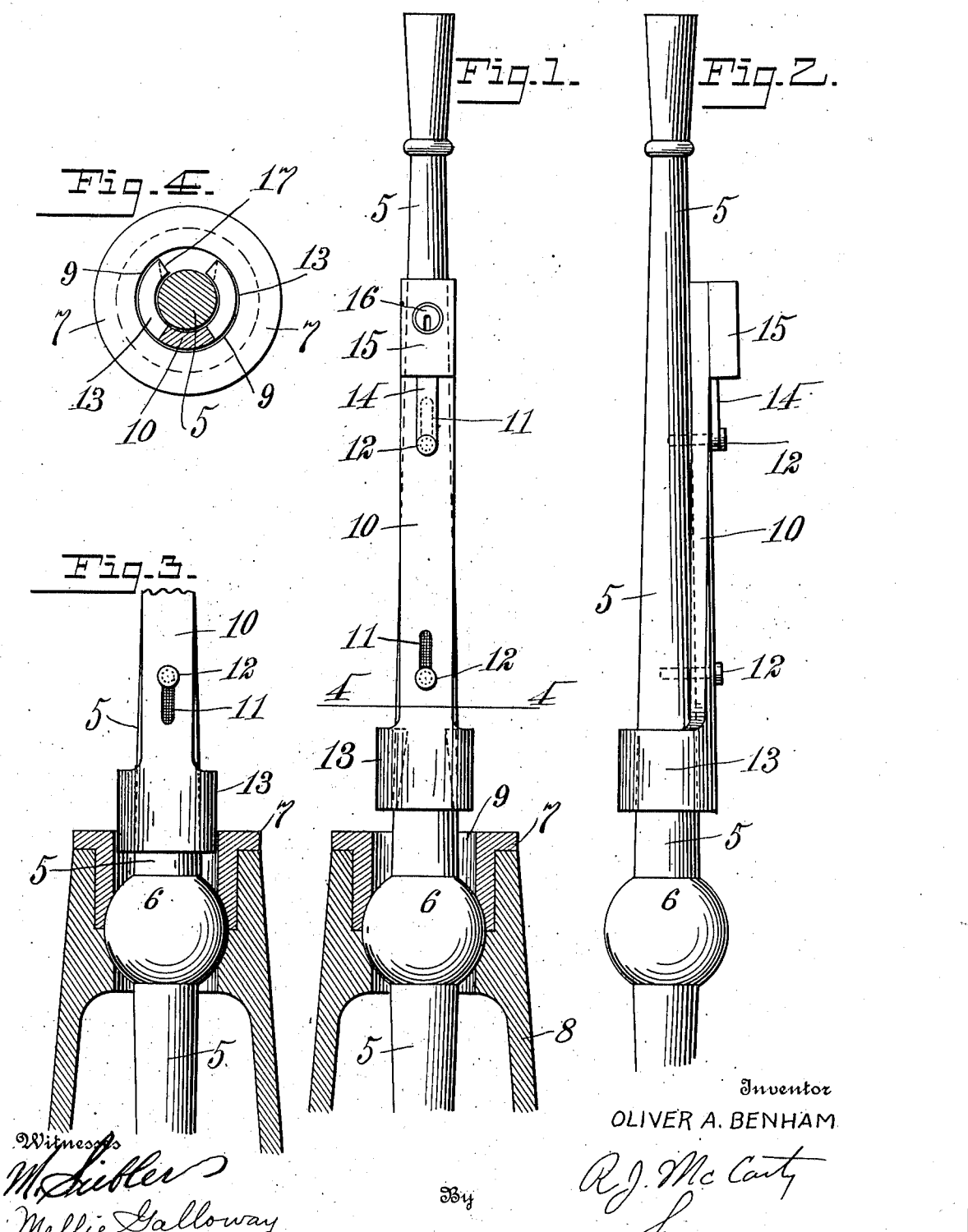

OLIVER A. BENHAM, OF DAYTON, OHIO.

LOCK FOR TRANSMISSION-LEVERS.

1,096,988.  Specification of Letters Patent.  Patented May 19, 1914.

Application filed March 20, 1913. Serial No. 755,603.

*To all whom it may concern:*

Be it known that I, OLIVER A. BENHAM, a citizen of the United States, residing at Dayton, in the county of Montgomery and State of Ohio, have invented certain new and useful Improvements in Locks for Transmission-Levers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in transmission lever locks for automobiles.

The object of the invention is to provide a lock of this type which is adapted to lock transmission levers as hereinafter described and claimed.

Referring to the accompanying drawings, Figure 1 is a side elevation of a transmission lever with my invention applied thereto, and the socket being shown in section; Fig. 2 is an elevation at right angles to Fig. 1; Fig. 3 is a fragmental view showing the locking member in a locking position; and Fig. 4 is a section on the line 4—4 of Fig. 1.

In the specification and drawings, similar reference characters indicate corresponding parts.

Referring more particularly to the drawings, 5 represents a transmission lever of an automobile. The lower end of said lever is provided with a ball 6 which rests in a socket formed by an upper member 7 and a lower member 8. The member 7 is provided with an opening 9 of larger diameter than the lever 5 to permit said lever to oscillate in all directions. When the said lever 5 is in a central position, or that shown in the drawings, it is neutral and the transmission gears of the automobile are inoperative, as is common in all automobiles.

To lock the lever 5 in its neutral position and to thereby prevent unauthorized persons operating the machine, the following device is provided. Mounted along the side of the lever 5 is a locking member consisting of a shank 10 provided with elongated openings 11. Extending through said openings 11 are head pins 12 which are rigidly secured in said levers 5 to maintain and guide said locking member. The pins 12 permit the said shank 10 to reciprocate on said lever 5 without being removed therefrom. Mounted on or attached to the lower end of the said shank 10 is an annular open head 13 which partially surrounds said lever 5. The outer diameter of said head 13 is slightly smaller than the diameter of the opening 9 of the socket member 7 thus permitting said head 13 to be placed within the member 7 when the shank 10 is lowered. When said head 13 lies within said opening 9, as is shown in Fig. 3, the lever 5 is prevented from being rocked or actuated, thereby preventing any shifting of the gears and insuring the automobile against operation. Said shank 10 and head 13 carried thereby may be locked in either the upper or lower position by any well known form of lock, or, as follows. Extending from and connected to the uppermost pin 12 is a lock-bolt 14 which extends into a lock 15 mounted on the extreme upper end of the shank 10. The lock 15, in the present instance, is provided with a key cylinder 16 which, when rotated by the proper key, will reciprocate the lock 15, shank 10 and head 13 on the lever 5, the bolt 14 remaining stationary relative to said lever 5. When said shank 10 and the parts carried thereby are at the end of their extreme movement, they are locked in said positions by the lock 16 which is common to the bolts of all locks. To enable the annular head 13 to be placed around said lever 5, said head 13 is provided with an opening 17 of a width sufficient to enable the said head to receive the small or upper end of the lever.

Having described my invention, I claim.

In a device for the purpose specified, the combination with a shifting lever having a ball portion, a socket member adapted to receive said ball portion, an annular member between said shifting lever and said socket member, and a slidable member mounted on said shifting lever, said slidable member having its lower end terminated in a head open on one side and surrounding said shifting lever, and an extension from said head lying parallel with the shifting lever, and means for locking said head and extended portion in a lowered position with the head in said socket member to prevent the operation of the shifting lever.

In testimony whereof I affix my signature, in presence of two witnesses.

OLIVER A. BENHAM.

Witnesses:
R. J. McCarty,
Matthew Siebler.